United States Patent [19]
Franc

[11] 3,740,543
[45] June 19, 1973

[54] BATTERY POWERED ILLUMINATED ORNAMENT
[76] Inventor: Charles Franc, 1501 First Avenue, New York, N.Y. 10021
[22] Filed: Aug. 10, 1971
[21] Appl. No.: 170,425

Related U.S. Application Data
[63] Continuation-in-part of Ser. No. 52,963, July 7, 1970, abandoned.

[52] U.S. Cl............................................ 240/6.4 R
[51] Int. Cl............................................ F21v 33/00
[58] Field of Search.................... 240/6.4 R, 10.61, 240/10.65, 10.6 R, 10.68, 10.6, 10 R

[56] References Cited
UNITED STATES PATENTS
3,444,363   5/1969   Peters ............................ 240/6.4 R
2,632,094   3/1953   Akerley .......................... 240/10.61
3,522,426   8/1970   Franc.............................. 240/6.4 R FOREIGN PATENTS OR APPLICATIONS
536,657   5/1941   Great Britain .................. 240/10.65

Primary Examiner—Richard C. Queisser
Assistant Examiner—Denis E. Corr
Attorney—Allison C. Collard

[57] ABSTRACT

A portable, illuminated ornament for illuminating a greeting card, gift package or the like, consisting of a flat, substantially rectangular bettery having a horizontally disposed, rectangular-shaped positive terminal affixed to one side thereof. A negative battery terminal, consisting of the battery casing and a rectangular member affixed to the same side of the battery as the positive terminal, is disposed parallel to the positive terminal. Either the positive or negative terminal may be provided with an aperture for receiving the base of a flame-shaped lamp. The ornament may be mounted in a greeting card which has an aperture in one surface thereof behind which the flame-shaped lamp is disposed, and an elongated slot which receives a flat tab disposed between the lamp base and the battery terminal to control illumination of the lamp.

8 Claims, 11 Drawing Figures

Patented June 19, 1973

INVENTOR.
CHARLES FRANC
BY
Attorney

Patented June 19, 1973

INVENTOR.
CHARLES FRANC
BY
Attorney

BATTERY POWERED ILLUMINATED ORNAMENT

This application is a continuation-in-part of application Ser. No. 52,963, filed on July 7, 1970, now abandoned entitled "BATTERY POWERED ILLUMINATED ORNAMENT."

The present invention invention relates to illuminated ornaments, and in particular, to a portable, battery operated illuminated ornament for use on greeting cards, gift packages, and the like.

Accordingly, the present invention provides a flat, substantially rectangular-shaped battery having a flat, horizontally disposed, positive terminal affixed to one side thereof, disposed either along, or perpendicular to, the longitudinal axis of the battery. A negative battery terminal, comprising the casing of the battery and a horizontally disposed rectangular member affixed to the same side of the battery as the positive terminal, is disposed parallel thereto. Either the positive terminal or the negative terminal may be provided with an aperture for receiving the base of a flame-shaped, or spherical, lamp, so that the remaining battery terminal engages the base of the lamp when it is inserted in the aperture, thereby illuminating the lamp and providing light. The ornament may be affixed to a greeting card, which has an aperture provided on one surface thereof so that the lamp is visible therein, and an elongated, horizontally disposed, slot provided adjacent the base of the lamp and the battery terminals for receiving a flat tab disposed between the lamp base and the battery terminal to control illumination of the lamp. The tab may be a separate member inserted in the slot, or may be cut from a flap of the card so that the tab is received in the slot when the card is closed.

It is therefore an object of the present invention to provide a portable, battery operated, illuminated device, for use on a greeting card, gift package or the like, which is simple in design, easy to manufacture, and efficient and reliable in operation.

Other objects and features of the present invention will become apparent from the following detailed description taken in connection with the accompanying drawings which disclose several embodiments of the present invention. It is to be understood, however, that the drawings are designed for the purpose of illustration only and not as a definition of the limits or scope of the invention.

In the drawings, wherein similar reference characters denote similar elements throughout the several views.

Figure 1:
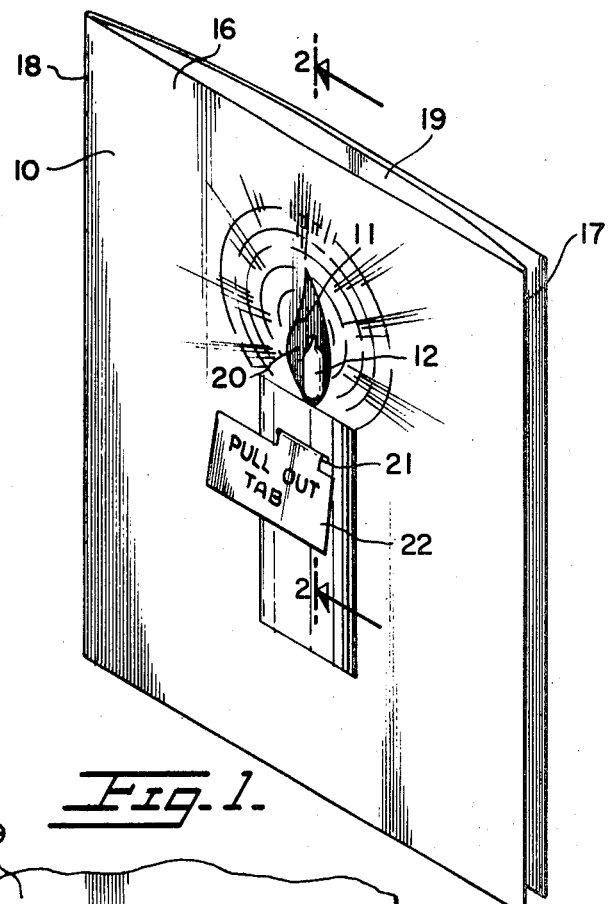
FIG. 1 is a perspective view of an illuminated ornament constructed in accordance with the present invention, shown mounted in a greeting card.

Referring to the drawings, there is shown a greeting card 10 having a flame-shaped aperture 11 behind which a flame-shaped lamp 12 is disposed. A substantially rectangular, flat battery 13 is provided with a horizontally disposed, flexible, metallic conductive member 14 which comprises, in conjunction with the battery casing, the negative terminal of battery 13, and a horizontally disposed rectangular-shaped positive terminal 15 affixed to the same side of battery 13 parallel to terminal 14. Battery 13 is mounted on the inside of flap 16 of card 10 by means of, for example, adhesive or glue. The card consists of a sheet of rigid, paper material, such as cardboard, folded into three rectangular sections along lines 17 and 18. First flap 19 is provided with a colored insert 20 which is disposed behind aperture 11 and lamp 12 to provide suitable background coloration for the illuminated lamp. Battery terminal 15 is provided with an aperture for threadably receiving the base of lamp 12. A contact terminal disposed on the bottom of the lamp engages terminal 14 so that the lamp is energized to produce light.

Battery 13 is mounted on the inside surface of flap 16 so that a horizontally disposed, elongated slot 21 provided in flap 16 is disposed adjacent terminal 14 and the contact terminal provided on the bottom of the base of lamp 12. A tab 22, which may be cardboard or some other suitable insulating material, is inserted in slot 21 so that it is disposed between the base of lamp 12 and terminal 14. Contact between the battery and the lamp is thereby broken, so that the lamp is not energized. This is preferable if, for example, the card is not in use. When tab 22 is removed from the slot, flexible terminal 14 moves upwardly under its own tension and engages the base of lamp 12 to energize the lamp.

Figure 3:
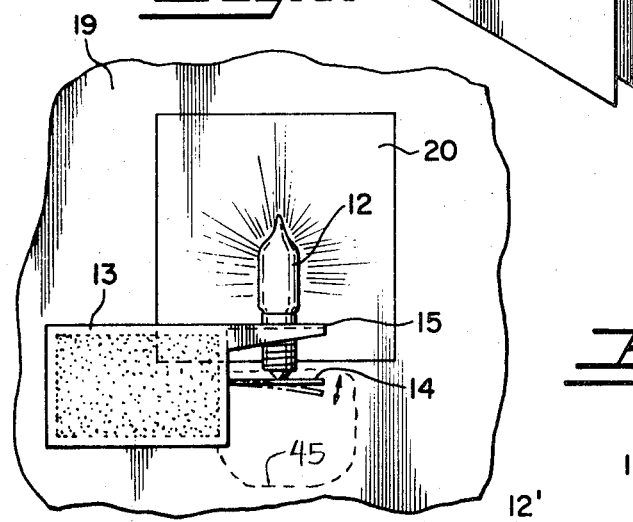
FIG. 3 is a partial front view of the inside flap of the greeting card of FIG. 1, showing one embodiment of an illuminated ornament constructed in accordance with the present invention.

Instead of using tab 22 to light lamp 12, a finger-sized opening 45, as shown in dotted line in FIG. 3, can be formed in card flap 19 to permit the user to have access to flexible terminal 14. The user can thus insert his finger tip in opening 45 and urge terminal 14 against lamp 12 to close the electrical contact and light the lamp.

Figure 2:
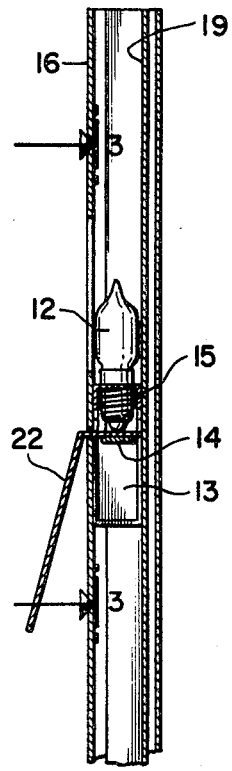
FIG. 2 is a cross-sectional view of the greeting card and ornament of the present invention, taken along section 2—2 of FIG. 1.
Figure 4:
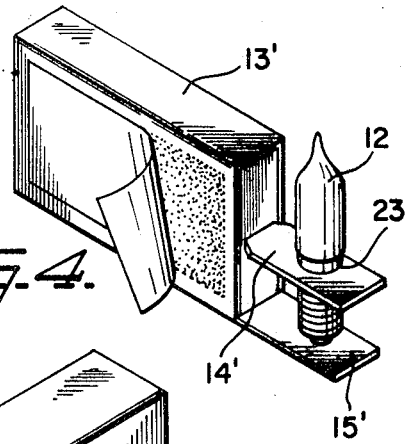
FIGS. 4, 5 and 6 are perspective views of further embodiments of an illuminated ornament constructed in accordance with the present invention.
Figure 5:
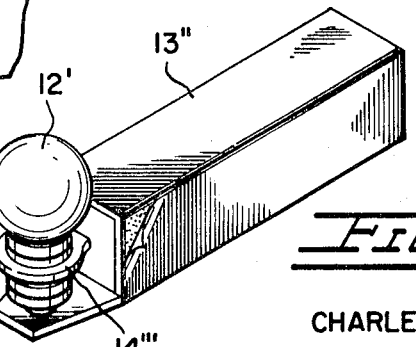
Figure 6:
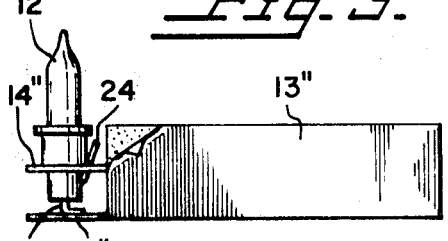
Figure 7:
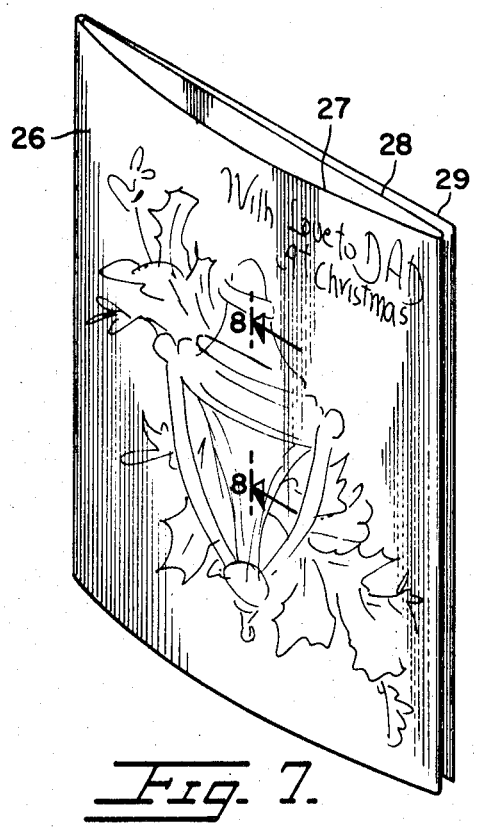
FIG. 7 is a perspective view of another greeting card in which the illuminated ornament of the present invention is mounted.
Figure 8:
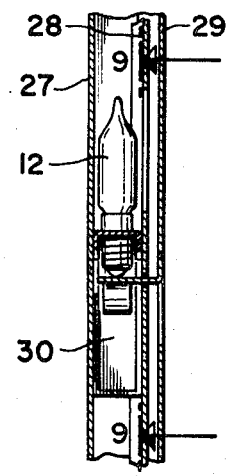
FIG. 8 is a cross-sectional view of the greeting card and ornament, taken along section 8—8 of FIG. 7.
Figure 9:
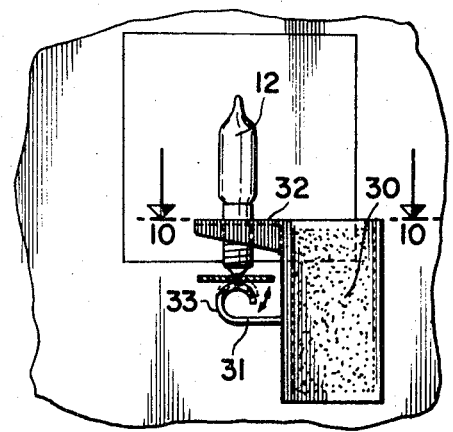
FIG. 9 is a front view of the illuminated ornament and inside flap of the greeting card of FIG. 7 showing another embodiment of an illuminated ornament constructed in accordance with the present invention.
Figure 11:
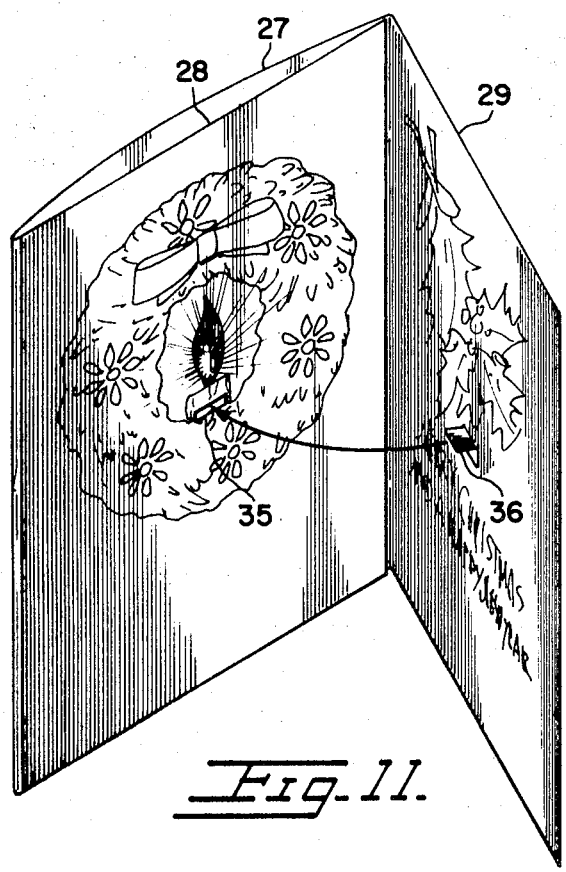
FIG. 11 is a perspective view of the inside flaps of the greeting card shown in FIG. 7.

The aperture provided in terminal 15 may also be provided in terminal 14, as shown in FIGS. 4, 5 and 6. The illuminated device shown in FIG. 4 is substantially the same as the device shown in FIGS. 1-3. However, a circular aperture 23 is provided in positive terminal 14' which is affixed to the side of battery 13'. Terminal 15', the negative terminal of the battery integrally formed with the battery casing, engages the base of lamp 12 in the same manner as the previous embodiment to illuminate the lamp.

Lamp 12 may be provided with a threaded base, or by cylindrical in shape having contact terminals 24 and 25 provided thereon for contacting the positive and negative battery terminals 14'' and 15'' respectively. The battery of the device may be a thin rectangular battery, as shown in FIGS. 1–4, or may have a cubical cross section as illustrated by battery 13'' in FIGS. 5 and 6. Any suitable size or shpae of battery may be used. The use of the ornament in each design will dictate the optimum size and shape of the battery. Terminal 14 may be rectangular in shape, or may be annular-shaped similar to terminal 14''' in FIG. 5. Lamp 12 may be flame-shaped, or may be spherical in shape, as desired.

In FIGS. 7–9 and 11, there is shown a greeting card 26 consisting of three flaps 27, 28 and 29 in which another embodiment of an illuminated ornament is mounted. Battery 30 has its longitudinal axis disposed vertically, and is provided with horizontally disposed positive and negative battery terminals 31 and 32, respectively, affixed to one side thereof. Positive terminal 31 has a semi-cylindrical extension 33 affixed thereto in order to insure a secure engagement of the base of lamp 12 when the lamp is inserted in negative battery terminal 32. Greeting card 26 is provided with a flame-shaped aperture 34 in flap 28 behind which lamp 12 is disposed. Battery 30 is mounted on the inside surface of flap 28, so that the base of lamp 12 and positive battery terminal 33 are disposed adjacent elongated horizontal slot 35 provided in flap 28. A rectangular flap 36, cut from flap 28, protrudes horizontally inwardly towards the center of the card, so that when the card is closed manually, the flap is inserted into slot 35 and between the base of lamp 12 and terminal 33. The current flow energizing lamp 12 is thereby shut off when the card is closed.

Figure 10:
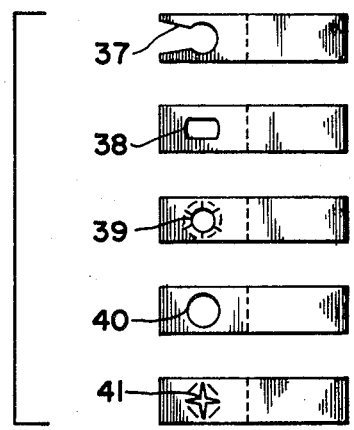
FIG. 10 is a top plan view of several different embodiments of battery terminals for an illuminated ornament of the present invention.

It should be noted that either terminal may be used to hold lamp 12, and the terminals may be disposed from any side of the battery. The battery terminals may also be provided with any type of suitable bulb receiving aperture, such as the key slot 37, rectangular aperture 38 wedge-in slit aperture 39, circular aperture 40, and cross-cut aperture 41, shown in FIG. 10.

The battery and terminals may be constructed of any suitable material, although the battery casing and negative terminal, which is preferably constructed as an extension of the casing, are preferably constructed of zinc. The positive terminal is preferably an extension of the carbon electrode of the battery.

While only several embodiments of the present invention have been shown and described, it will be apparent to those persons skilled in the art that many changes and modifications may be made thereunto without departing from the spirit and scope of the invention.

What is claimed is:
1. A portable, illuminated ornament, comprising:
a lamp for providing illumination;
a flat battery, having a first flat output terminal affixed to a side surface thereof, said terminal extending outwardly from the side of said battery and having an aperture for receiving the base of said lamp, and a second output terminal, formed by the casing of said battery and a flat conductive member affixed to the same side of said battery as said first output terminal and disposed parallel thereto, for engaging said lamp and electrically coupling said battery thereto;
a greeting card, having an aperture in an inside surface thereof behind which said battery is mounted so that said lamp is visible therethrough, and including an elongated slot on the inside sufrace of said greeting card adjacent said first terminal of said battery; and
a planar tab, affixed to the inside surface of said greeting card, and disposed opposite said battery so that said slot receives said tab when said greeting card is closed for electrically insulating said battery from said lamp until said greeting card is opened.

2. The illuminated ornament as recited in claim 1, wherein said first and second battery terminals are disposed perpendicular to the longitudinal axis of said battery and said lamp.

3. The illuminated ornament as recited in claim 2, wherein said second output terminal further comprises a curved extension, affixed to the end thereof, extending upwardly from said second terminal for engaging said lamp disposed in said first output terminal and thereby electrically coupling said lamp to said battery.

4. A portable, illuminated ornament, comprising:
a lamp for providing illumination;
a flat battery, having a flat first output terminal affixed to a side surface thereof, said terminal extending outwardly from the side of said battery and having an aperture for receiving said lamp, and a second output terminal, formed by the casing of said battery and a flat conductive member affixed to the same side of said battery as said first output terminal, and disposed parallel thereto, for engaging said lamp and thereby electrically coupling said lamp to said battery;
a greeting card, having an aperture provided in the front surface thereof behind which said battery is mounted so that said lamp is visible therethrough, and including an elongated slot provided in the front surface of said greeting card adjacent said first battery terminal and said lamp; and
a planar tab, disposed through said elongated slot between said first battery terminal and the base of said lamp, for electrically insulating said lamp from said battery until said tab is removed.

5. The illuminated ornament as recited in claim 4, wherein said first and second battery terminals are disposed outwardly parallel to the longitudinal axis of said battery.

6. The illuminated ornament as recited in claim 5, wherein said first output terminal comprises an annular-shaped conductive member.

7. The illuminated ornament as recited in claim 6, wherein said lamp is flame-shaped, and has an annular base, having first and second elongated contact terminals affixed thereto, which is slidably received by said aperture in said first terminal.

8. The illuminated ornament as recited in claim 4, wherein said first output terminal is a flat, electrically-conductive member.

* * * * *